(12) United States Patent
Atari et al.

(10) Patent No.: US 10,113,613 B2
(45) Date of Patent: Oct. 30, 2018

(54) PLANETARY GEAR MECHANISM AND POWER TRANSMISSION MEMBER THEREOF

(71) Applicants: Hidekazu Atari, Tokyo (JP); Manabu Shiraki, Yamato (JP)

(72) Inventors: Hidekazu Atari, Tokyo (JP); Michito Atari, Tokyo (JP)

(73) Assignees: Hiedkazu Atari, Tokyo (JP); Manabu Shiraki, Kanagawa (JP)

( * ) Notice: Subject to any disclaimer, the term of this patent is extended or adjusted under 35 U.S.C. 154(b) by 240 days.

(21) Appl. No.: 15/022,491

(22) PCT Filed: Sep. 10, 2014

(86) PCT No.: PCT/JP2014/073841
§ 371 (c)(1),
(2) Date: Mar. 16, 2016

(87) PCT Pub. No.: WO2015/041107
PCT Pub. Date: Mar. 26, 2015

(65) Prior Publication Data
US 2016/0230844 A1    Aug. 11, 2016

(30) Foreign Application Priority Data

Sep. 17, 2013   (JP) .................. 2013-192475

(51) Int. Cl.
*F16H 57/08* (2006.01)
*F16H 1/28* (2006.01)

(52) U.S. Cl.
CPC ............. *F16H 1/28* (2013.01); *F16H 57/082* (2013.01)

(58) Field of Classification Search
CPC ....... F16H 1/2863; F16H 57/082; F16H 51/00
See application file for complete search history.

(56) References Cited

U.S. PATENT DOCUMENTS

| 9,822,843 | B2* | 11/2017 | Eberle ........................ F16H 1/46 |
| 2008/0113842 | A1* | 5/2008 | Kinoshita ............ B60K 17/346 |
| | | | 475/205 |
| 2009/0291798 | A1* | 11/2009 | Fujii ..................... F16H 48/285 |
| | | | 475/220 |

FOREIGN PATENT DOCUMENTS

| EP | 2 182 244 A1 | 5/2010 |
| JP | 62-159831 A | 7/1987 |

(Continued)

OTHER PUBLICATIONS

International Search Report (PCT/ISA/210) dated Dec. 9, 2014, by the Japanese Patent Office as the International Searching Authority for International Application No. PCT/JP2014/073841.

(Continued)

*Primary Examiner* — Tisha D Lewis
(74) *Attorney, Agent, or Firm* — Buchanan Ingersoll & Rooney PC

(57) ABSTRACT

A power transmission member is disclosed. The power transmission member allows a planetary gear mechanism to be reduced in volume while sufficient strength is guaranteed. A planetary gear holding part, a rotating shaft part, and a sun gear holding part constituting a power transmission member are formed integrally. The rotating shaft part is substantially cylindrical, and a planetary gear can be passed through the interior of the rotating shaft part and turnably mounted on the planetary gear holding part. An open window is formed in the planetary gear holding part, and a toothed part of the planetary gear is configured to mesh with a bearing-equipped outer gear through the open window.

6 Claims, 11 Drawing Sheets

(56) References Cited

FOREIGN PATENT DOCUMENTS

| JP | 1-121566 A | 5/1989 |
|---|---|---|
| JP | 10-231903 A | 9/1998 |
| JP | 2009-215191 A | 9/2009 |
| JP | 2010-263761 A | 11/2010 |

OTHER PUBLICATIONS

Written Opinion (PCT/ISA/237) dated Dec. 9, 2014, by the Japanese Patent Office as the International Searching Authority for International Application No. PCT/JP2014/073841.

* cited by examiner

PLANETARY GEAR MECHANISM AND POWER TRANSMISSION MEMBER THEREOF

TECHNICAL FIELD

The present invention relates to a planetary gear mechanism and a member that is a member of the planetary gear mechanism and causes the planetary gear mechanism to exert a function of transmitting rotation and torque to a driven shaft from a drive shaft.

BACKGROUND ART

In the related art, a planetary gear mechanism is known as a transmission mechanism of rotative power. As an example of a planetary gear mechanism known in the related art, there is a technology including: a drive shaft (input shaft) adapted to be turned by drive force transmitted from a drive source; a sun gear attached to the drive shaft and adapted to be integrally rotated with the drive shaft; an internal gear provided coaxially with the sun gear via a predetermined space with the sun gear; a plurality of planetary gears provided at predetermined angular intervals in the space, and adapted to be engaged with the sun gear and the internal gear; a planetary carrier (rotary arm) provided coaxially with the sun gear and adapted to support the plurality of planetary gear in a freely turnable manner; and a driven shaft (output shaft) connected to the planetary carrier (refer to Patent Literature 1, for example). According the this structure, when the drive shaft is rotated while the internal gear in a fixed state, the planetary gears revolve around the sun gear while rotating on its own axis, and the driven shaft connected to the planetary carrier is rotated by this revolving motion.

According to the related art, the planetary carrier is normally provided at an end of the driven shaft and the plurality of planetary gears is provided in a freely turnable manner relative to the planetary carrier provided at the end (refer to Patent Literature 1, for example).

As a means to support the planetary gear in a freely turnable manner relative to the planetary carrier, in the related art, there is a case where a bearing hole is formed at the planetary carrier, the planetary gear having a through-hole formed in a rotary shaft direction is moved such that the bearing hole and the through-hole are aligned, and then the planetary gear is attached to the planetary carrier in a freely turnable manner by inserting a planetary pin (shaft pin) into the bearing hole and the through-hole. In the case of adopting this means, the through-hole is needed to be formed at a rotary center portion of each planetary gear.

Furthermore, as a means to attach the planetary gear in a freely turnable manner without preparing the planetary pin as a separate body, there is a case in the related art where a shaft portion is preliminarily formed integrally with a planetary gear body on each of both side surfaces of the planetary gear as a substitute of the planetary pin, and the planetary gear including the shaft portions is attached in a manner sandwiched between a pair of divided planetary carriers. In the case of adopting this means, the planetary carriers including bearing holes are preliminarily formed in a divided manner, and the planetary gear is sandwiched between the pair of the planetary carriers such that the shaft portions of the planetary gear are inserted into the bearing holes, and further the pair of divided planetary carriers is fastened by screwing or caulking, thereby attaching the planetary gear having the planetary pin to the planetary carrier in a freely turnable manner.

Since the planetary gear mechanism is used while being incorporated inside various kinds of mechanical devices such as a generator, a motor screw driver, and a washing machine, generally there is a demand to reduce volume thereof (size reduction). According to the technology disclosed in Patent Literature 1, the volume of an entire device is reduced by incorporating the planetary gear mechanism inside the motor rotor.

CITATION LIST

Patent Literature

Patent Literature 1: JP 2010-263761 A

SUMMARY OF INVENTION

Technical Problem

As described above, volume reduction of a planetary gear mechanism is demanded, but in the invention of the above-described Patent Literature 1, there may be a problem in which only a size of each component is reduced as such a means, but strength as a gear mechanism cannot be secured.

Furthermore, since the planetary gear mechanism used by being incorporated inside various kinds of mechanical devices as described above, there may be a problem in which repair at the time of failure is not easy. The planetary gear mechanism is also required to have sufficient strength in order to improve durability.

Furthermore, in the case of using a planetary pin as a means to attach the planetary gear to a planetary carrier, a through-hole for the planetary pin is needed to be formed on the planetary gear, but there may be problem in which a sufficient thickness (rim thickness) to a tooth bottom can be hardly secured, and dedendum strength of the planetary gear cannot be secured.

On the other hand, in the case of not using the planetary pin as the means to attach the planetary gear to the planetary carrier, more specifically, in the case of using the planetary gear preliminarily formed integrally with shaft portions, each planetary carrier is fastened by screwing or caulking in a state that the planetary gear is sandwiched between a pair of divided planetary carriers. However, there may be a problem in which such a fastening means cannot secure sufficient strength against torsional force.

Furthermore, generally, in the case where torque to be transmitted to a rotary shaft is large, a diameter of the rotary shaft is needed be formed large to cope with the large torque. However, in the case where the diameter of the rotary shaft is formed large, there may be a problem in which the volume of the planetary gear mechanism becomes large.

The present invention is made to solve the above-described problems, and directed to providing a planetary gear mechanism and a power transmission member thereof, in which the volume of the planetary gear mechanism can be reduced while sufficient strength is secured.

Solution to Problem

To achieve the above-described objects, the inventor of the present application has gone through trials and errors and finally achieved to invent a planetary gear mechanism and a power transmission member thereof.

According to a first mode of the present invention, provided is a power transmission member that is a power transmission of a planetary gear mechanism adapted to support, in a freely turnable manner, a planetary gear to be engaged with a sun gear and an internal gear. The power transmission member includes:

planetary gear holding portion in which a planetary gear attachment portion to attach the planetary gear in a freely turnable manner is formed in a rotary shaft direction, a bearing portion to support, in a freely turnable manner, one end of the planetary gear attached to the planetary gear attachment portion is formed in a rotary shaft direction and communicates with the one end of the planetary gear attachment portion, and an open window is formed on a peripheral surface such that a tooth portion of the planetary gear attached to the planetary gear attachment portion projects from an outer peripheral surface;

a substantially cylindrical-shaped rotary shaft portion adapted to communicate with the other end of the planetary gear attachment portion, and having a rotation support hole that is formed in the rotary shaft direction and supports, in a freely turnable manner, the other end of the planetary gear attached to the planetary gear attachment portion; and a sun gear holding portion having a sun gear insertion hole that is formed in a rotary shaft direction and is adapted to insert a shaft portion of the sun gear into a center shaft of the planetary gear holding portion in a freely turnable manner.

In this power transmission member, the planetary gear holding portion, the rotary shaft portion, and the sun gear holding portion are formed as an integrated body. In the present application, the power transmission member is a member of the planetary gear mechanism and a member to cause the planetary gear mechanism to exert a function of transmitting rotation and torque from a drive shaft to a driven shaft, and also has a structure in which the planetary gear can be attached inside.

According to the power transmission member of the first mode of the present invention, the volume of the planetary gear mechanism can be reduced while sufficient strength is secured. Moreover, according to the power transmission member of the first mode of the present invention, even in the case of using a planetary gear in which a tooth portion and a shaft portion are integrally formed, the planetary gear is not needed to be attached in a manner sandwiched between a pair of divided planetary carriers unlike the related art. In other words, the planetary gear is inserted from an opening end portion of the rotary shaft portion, and can be attached to the planetary gear attachment portion via the rotation support hole. In the power transmission member according to the first mode of the present invention, the respective planetary gear holding portion, rotary shaft portion, and sun gear holding portion are formed as the integrated body. Therefore, sufficient strength can be secured against torsional force. Generally, in the case where torque to be transmitted to the rotary shaft is large, stiffness is needed to be enhanced by increasing a shaft diameter of the rotary shaft to cope with the large torque. However, according to the power transmission member of the first mode of the present invention, the rotary shaft portion is formed substantially cylindrical and the planetary gear is attached inside the rotary shaft portion and the planetary gear holding portion. Therefore, even in the case of increasing the rotary shaft diameter in order to secure strength, the volume of the entire planetary gear mechanism can be prevented from being increased. Moreover, according to the power transmission member of the first mode of the present invention, the planetary gear can be easily inserted and removed from the opening end portion of the rotary shaft portion. Therefore, repair is easily performed for each component at the time of failure.

Additionally, according to a second mode of the present invention, provided is a planetary gear mechanism that includes: the power transmission member according to the first mode of the present invention; and a planetary gear having a tooth portion and a shaft portion integrally formed and attached to the planetary gear attachment portion.

According to the planetary gear mechanism of the second mode of the present invention, the volume of the planetary gear mechanism can be reduced while sufficient strength is secured. Since the sufficient strength can be secured against torsional force, the planetary gear is easily attached, repair is easily performed for each component at the time of failure, and also there is no need to form a through-hole to insert a planetary pin in the planetary gear, sufficient dedendum strength of the planetary gear can be secured even when an outer diameter of the planetary gear is set small. Therefore, the volume of the entire planetary gear mechanism can be reduced while sufficient strength is secured by setting the outer diameter of the planetary gear small.

Furthermore, preferably, the planetary gear is a planetary gear in which a size in a rotary shaft direction is twice or more of a size in a radial direction in a tooth portion of the planetary gear. In addition to the above-described effects of the planetary gear mechanism according to the second mode of the present invention, an area of an engagement portion between the planetary gear, sun gear, and internal gear can be increased. Consequently, strength of the planetary gear can be secured even when the outer diameter of the planetary gear is set small. Therefore, the volume of the entire planetary gear mechanism can be more reduced while sufficient strength is secured. Generally, when the entire planetary gear mechanism is elongated in the rotary shaft direction, stiffness against torsional force is hardly secured. However, according to the planetary gear mechanism of the second mode of the present invention, the respective planetary gear holding portion, rotary shaft portion, and sun gear holding portion are formed as the integrated body. Therefore, sufficient strength can be secured against torsional force.

Furthermore, preferably, the sun gear is a sun gear in which a size in a rotary shaft direction is twice or more of a size in a radial direction in a tooth portion of the sun gear. In addition to the above-described effects of the planetary gear mechanism according to the second mode of the present invention, an area of an engagement portion between the sun gear and the planetary gear can be increased. Consequently, strength of the sun gear can be secured even when the outer diameter of the sun gear is set small, and additionally the plurality of planetary gears to be engaged with the sun gear is arranged close by setting the outer diameter of the sun gear small. Therefore, the sizes in the radial direction of the planetary gear holding portion and the internal gear can be set small, and the volume of the entire planetary gear mechanism can be more reduced.

Additionally, according to a third mode of the present invention, provided is a planetary gear mechanism that is a power transmission member of a planetary gear mechanism adapted to support, in a freely turnable manner, a planetary gear to be engaged with a sun gear and an internal gear. The planetary gear mechanism includes:

a planetary gear holding portion in which a planetary gear attachment portion to attach the planetary gear in a freely turnable manner is formed in a rotary shaft direction, a bearing portion to support, in a freely turnable manner, one end of the planetary gear attached to the planetary gear attachment portion is formed in a rotary shaft direction and communicates with the one end of the planetary gear attachment portion, and an open window is formed on a peripheral surface such that a tooth portion of the planetary gear attached to the planetary gear attachment portion projects from an outer peripheral surface; and a sun gear holding portion having a sun gear insertion hole that is formed in a rotary shaft direction and is adapted to insert a shaft portion of the sun gear into a center shaft of the planetary gear holding portion in a freely turnable manner, and the sun gear holding portion being formed integrally with the planetary gear holding portion.

In the planetary gear holding portion, the planetary gear attachment portions, the bearing portions, the open windows are formed at a plurality of positions at equal intervals around a rotary shaft, and additionally an opening end portion to be fastened to a driven shaft including a flange portion is provided.

According to the power transmission member of the third mode of the present invention, the volume of the planetary gear mechanism can be reduced while sufficient strength is secured. The planetary gear is easily attached and repair is easily performed for each component at the time of failure, and moreover the planetary gear attached to the planetary gear attachment portion can be prevented from falling off by fastening the flange portion provided at the driven shaft to the opening end portion side of the planetary gear holding portion. Furthermore, different from the power transmission member according to the first mode of the present invention, the planetary gear is not arranged inside the driven shaft connected to the planetary gear mechanism. Therefore, there is no need to provide a space to insert the planetary gear inside the driven shaft, and a shaft diameter of the driven shaft can be set small. Consequently, the volume on the driven shaft side can be reduced.

According to the power transmission member of the third mode of the present invention, preferably, the planetary gear mechanism has a structure in which the tooth portion and the shaft portion are integrally formed and assembled with the planetary gear attached to the planetary gear attachment portion, a size in a rotary shaft direction is twice or more of a size in a radial direction in the tooth portion of the planetary gear, and a size in the rotary shaft direction is twice or more of a size in a radial direction in the tooth portion of the sun gear.

Advantageous Effects of Invention

According to the present invention, the volume of the planetary gear mechanism can be reduced while sufficient strength is secured.

DESCRIPTION OF EMBODIMENTS

In the following, regarding a power transmission member and a planetary gear mechanism, preferred embodiments to implement the present invention will be specifically described using work examples with reference to the attached drawings. However, the present invention is not limited thereto.

Power Transmission Member: First Work Example

Figure 1:
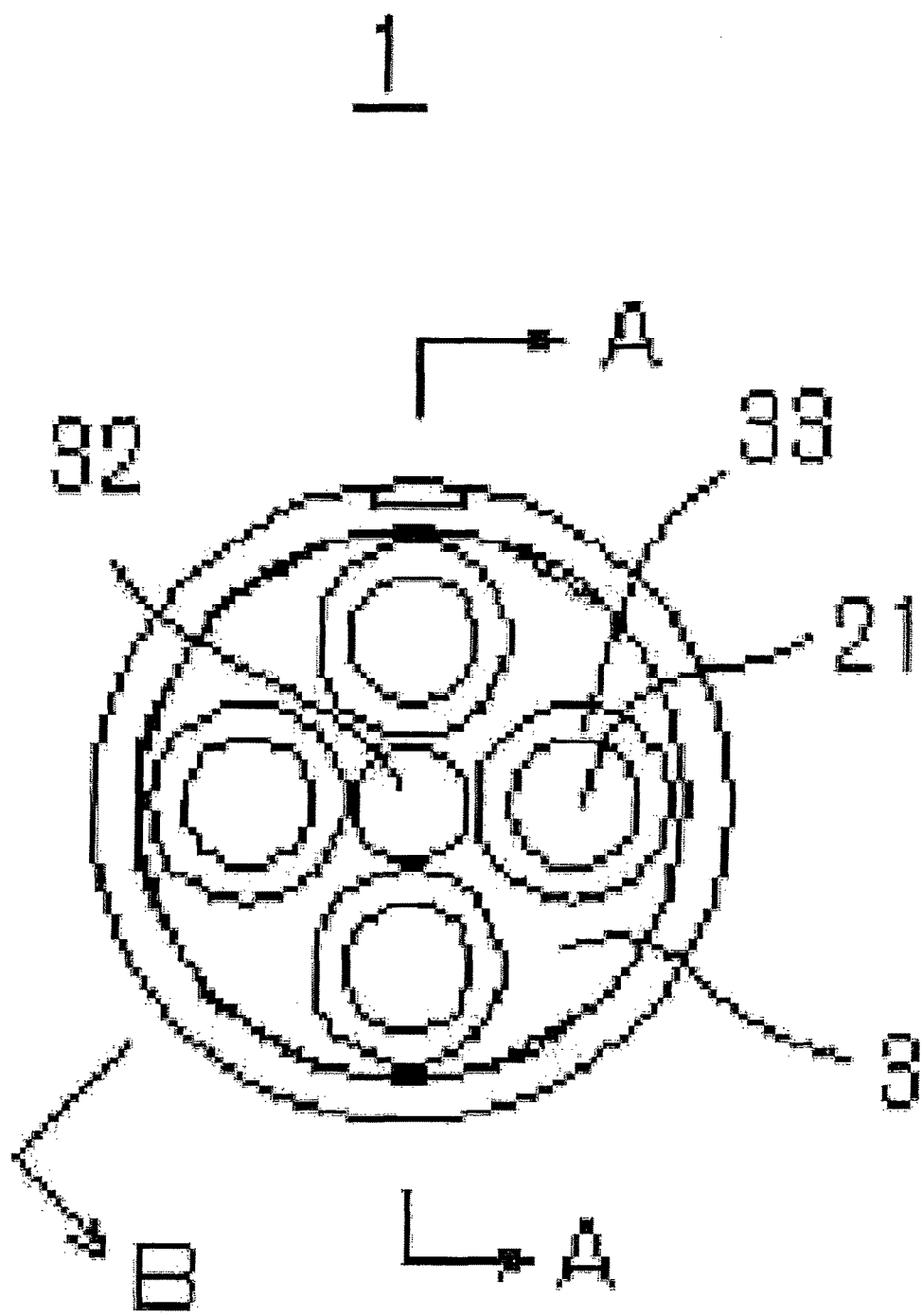
FIG. 1 is a schematic diagram illustrating a right side surface of a power transmission member according to a first work example of the present invention.
Figure 2A:
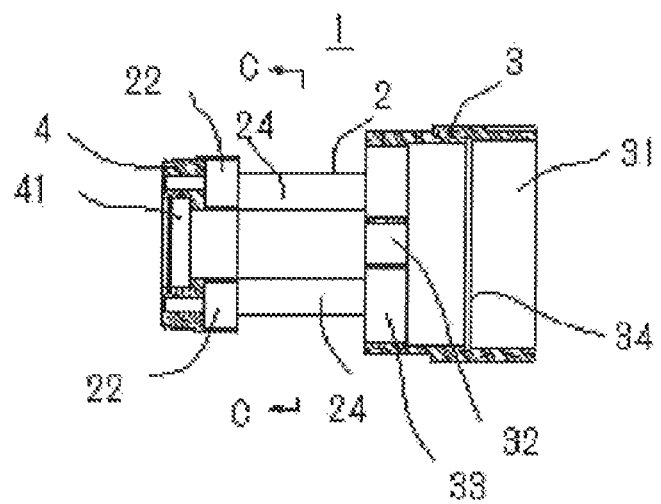
FIG. 2(a) is a schematic cross-sectional view taken along A-A and FIG. 2(b) is a schematic cross-sectional view taken along A-B in the power transmission member according to the first work example of the present invention.
Figure 2B:
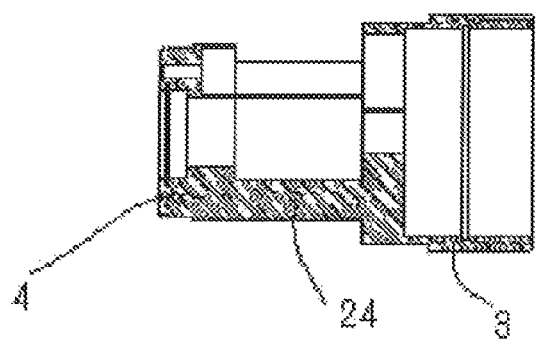
Figure 3:
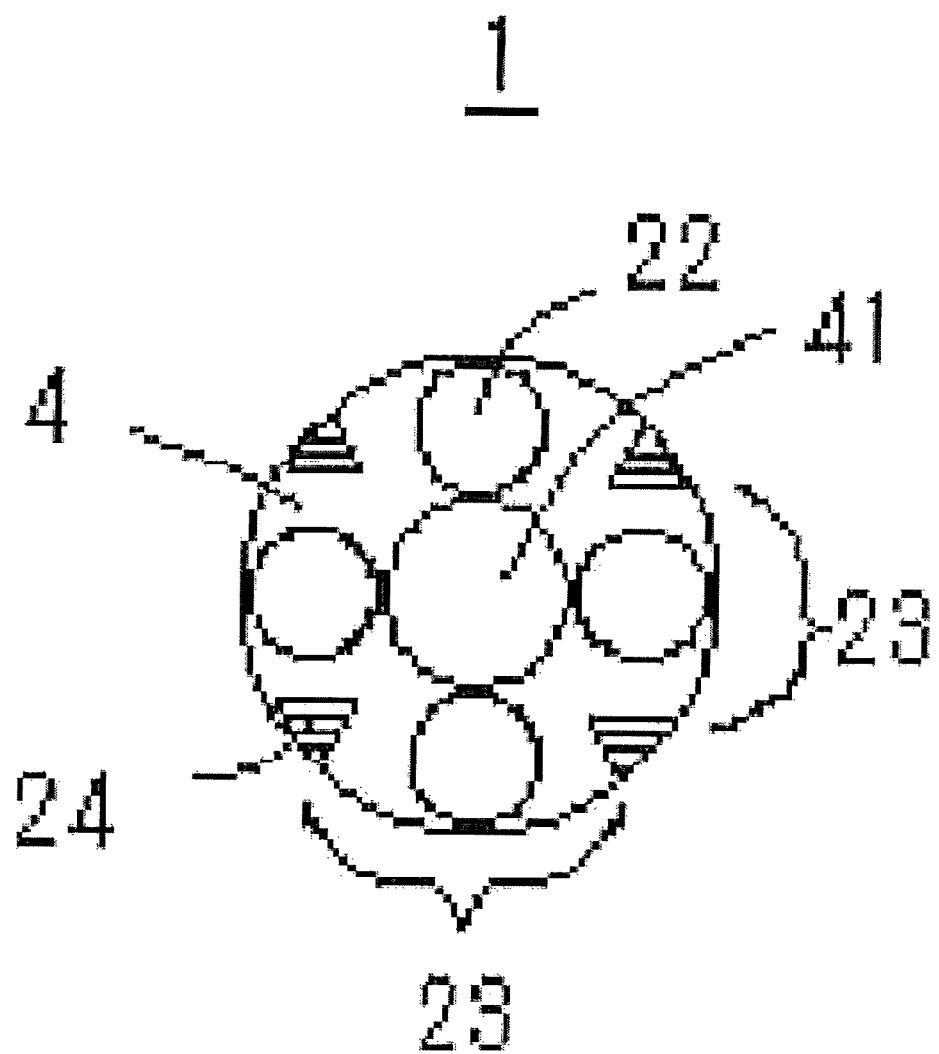
FIG. 3 is a schematic cross-sectional view taken along C-C of the power transmission member according to the first work example of the present invention.

First, a power transmission member according to a first work example of the present invention will be described using FIGS. 1 to 3. FIG. 1 is a schematic diagram illustrating a right side surface of the power transmission member according to the first work example of the present invention. Note that a side from which a sun gear is inserted is a left side surface and a side located on a rotary shaft side is a right side surface. Furthermore, FIG. 2(a) is a schematic cross-sectional view taken along A-A and FIG. 2(b) is a schematic cross-sectional view taken along A-B in the power transmission member according to the first work example of the present invention. FIG. 3 is a schematic cross-sectional view taken along C-C of the power transmission member according to the first work example of the present invention.

The power transmission member 1 according to the first work example of the present invention is adapted to support, in a freely turnable manner, a planetary gear to be engaged with a sun gear and an internal gear, in which a substantially cylindrical-shaped planetary gear holding portion 2, a rotary shaft portion 3, and a sun gear holding portion 4 are integrally formed. In the power transmission member 1 according to the first work example, outer diameters of planetary gear holding portion 2, rotary shaft portion 3, and sun gear holding portion 4 are varied stepwise, and the sun gear holding portion 2 has the outer diameter larger than the planetary gear holding portion 4, and the rotary shaft portion 3 has the outer diameter larger than the planetary gear holding portion 2.

The planetary gear holding portion 2 is substantially cylindrical-shaped, and a planetary gear attachment portion 21 and a bearing portion 22 are formed inside thereof, and additionally an open window 23 is formed on outer surface thereof.

Among these components, the planetary gear attachment portion 21 is formed in a hollow extending in a rotary shaft direction of the planetary gear, and the planetary gear is arranged inside the hollow in a freely turnable manner. In order to hold a shaft portion of the planetary gear in a freely turnable manner, the bearing portion 22 is in communication with one end of the planetary gear attachment portion 21 and formed in the rotary shaft direction.

Furthermore, the open windows 23 are formed at predetermined intervals on an outer peripheral surface of the planetary gear holding portion 2 such that a tooth portion of the planetary gear projects from the open window 23 on the outer peripheral surface at the time of arranging the planetary gear in the planetary gear attachment portion 21. Each of the open windows 23 is partitioned by an open window frame 24 extending in the shaft direction, and the rotary shaft portion 3 and the sun gear holding portion 4 are integrated via the open window frame 24.

The rotary shaft portion 3 is substantially cylindrical-shaped, and the planetary gear can be inserted into the rotary shaft portion 3 from an opening end portion 31 side. Inside the rotary shaft portion 3, a through-hole 32 is formed around the rotary shaft. As described below, a tip portion of the sun gear is attached to this through-hole 32 in a freely turnable manner via the bearing.

Around the through-hole 32, rotation support holes 33 are formed at equal intervals in the rotary shaft direction, and the rotation support hole 33 is in communication with the other end of the planetary gear attachment portion 21. An inner diameter of the rotation support hole 33 is set larger than an outer diameter of the planetary gear. Therefore, the planetary gear inserted from the opening end portion 31 side and introduced into the power transmission member 1 can be arranged in the planetary gear attachment portion 21 via the rotation support hole 33. According to the power transmission member 1 of the first work example of the present invention, even in the case of using a planetary gear in which the tooth portion and the shaft portion are integrally formed, the planetary gear is not needed to be attached in a manner sandwiched between a pair of divided planetary carriers.

A needle bearing (not illustrated) is attached to the shaft portion of the planetary gear, and this needle bearing is attached to the rotation support hole 33, thereby supporting, in a freely turnable manner, the shaft portions on both ends of the planetary gear arranged in the planetary gear attachment portion 21 by means of the bearing portion 22 and the rotation support hole 33. Since the planetary gear can be easily inserted and removed from the opening end portion 31 of the rotary shaft portion 3, repair is easily performed at the time of failure.

The sun gear holding portion 4 is a substantially cylindrical-shaped member, and a sun gear insertion hole 41 is formed in a shaft center portion thereof in the rotary shaft direction. Inside the sun gear insertion hole 41, a shaft portion of the sun gear is inserted in a freely turnable manner. A tooth portion of the sun gear inserted into this sun gear insertion hole 41 is engaged with the tooth portion of the planetary gear attached to the planetary gear attachment portion 21.

The planetary gear holding portion 2, rotary shaft portion 3, and sun gear holding portion 4 are formed as an integrated body. In the power transmission member 1 according to the first work example of the present invention, the power transmission member 1 of the planetary gear mechanism is integrally formed by hollowing out same metallic material, or the like. Therefore, when the sun gear inserted into the sun gear insertion hole 41 is rotated, the planetary gear engaged with this sun gear revolves around the sun gear while rotating on its own axis. With this revolving motion, the planetary gear holding portion 2, rotary shaft portion 3, and sun gear holding portion 4 are rotated as the integrated body. Since the respective planetary gear holding portion 2, rotary shaft portion 3, and sun gear holding portion 4 are integrally formed, sufficient strength can be secured against torsional force. The power transmission member 1 according to the first work example of the present invention is stronger against torsional force than a power transmission member 1C according to a second work example of the present invention described below.

Furthermore, according to the power transmission member 1 of the first work example of the present invention, the planetary gear is attached to the inside of the rotary shaft portion 3 and the planetary gear holding portion 2. Therefore, even in the case where a shaft diameter of the rotary shaft portion 3 is formed large in order to secure strength, the volume of the entire planetary gear mechanism can be prevented from being increased.

In the power transmission member 1 according to the first work example of the present invention, the plural planetary gear attachment portions 21, bearing portions 22, and open windows 23 are formed at equal intervals in a circumferential direction. Furthermore, in the rotary shaft portion 3, the plurality of rotation support holes 33 is formed by a hollow-out process at equal intervals in the circumferential direction, correlated to the plurality of planetary gear attachment portions 21. Consequently, the plurality of planetary gears can be attached to the power transmission member 1. The power transmission member 1 according to the first work example of the present invention has a structure in which four planetary gears can be attached. The number of planetary gears may be two or three, but the larger the number of planetary gears is, the more the transmission torque can be increased while strength against torsion can be secured.

According to the power transmission member 1 of the first work example of the present invention, the volume of the planetary gear mechanism can be reduced while sufficient strength is secured.

Planetary Gear Mechanism: First Work Example

Next, a planetary gear mechanism in which the power transmission member 1 according to the first work example of the present invention is incorporated will be described using FIGS. 4 to 6 as a use example of the power transmission member 1 according to the first work example of the present invention.

Figure 4A:
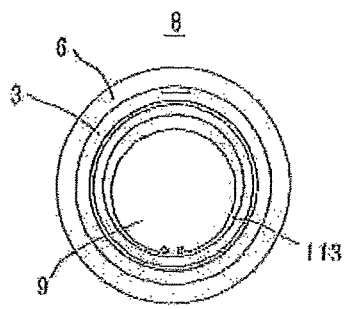
FIG. 4(a) is a schematic right side view and FIG. 4(b) is a schematic left side view of a planetary gear mechanism according to a first work example of the present invention in which the power transmission member according to the first work example of the present invention is incorporated.
Figure 4B:
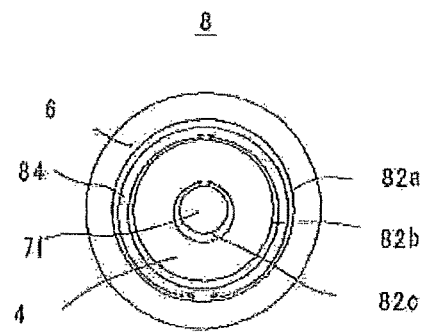
Figure 4C:
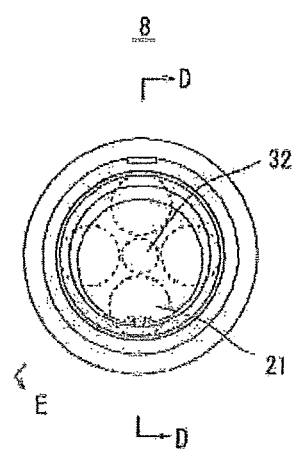
FIG. 4(c) is a schematic right side view illustrating arrangement of planetary gears.
Figure 5A:
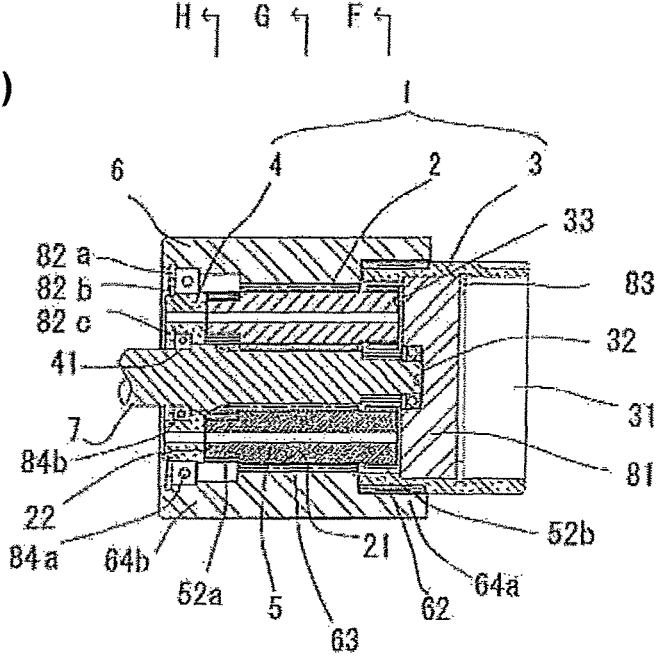
FIG. 5(a) is a schematic cross-sectional view taken along D-D and FIG. 5(b) is a schematic cross-sectional view taken along D-E of the planetary gear mechanism according to the first work example of the present invention.
Figure 5B:
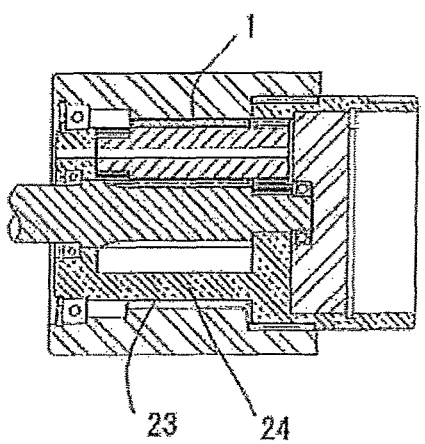
Figure 6A:
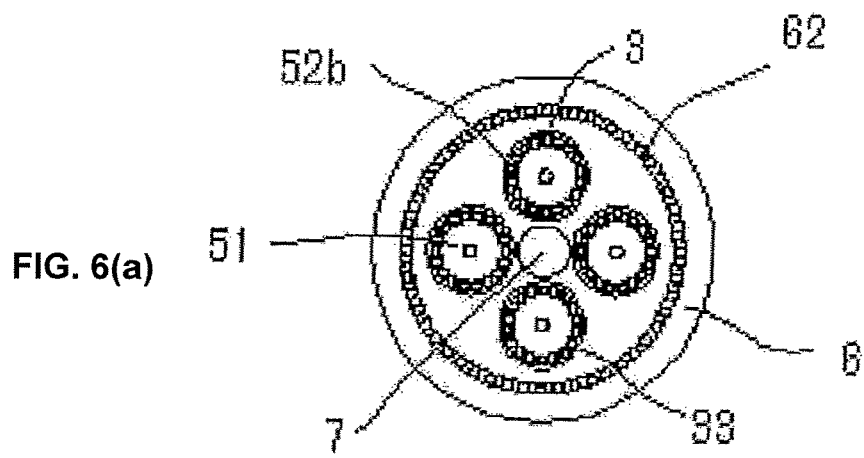
FIG. 6(a) is a schematic cross-sectional view taken along F-F.
Figure 6B:
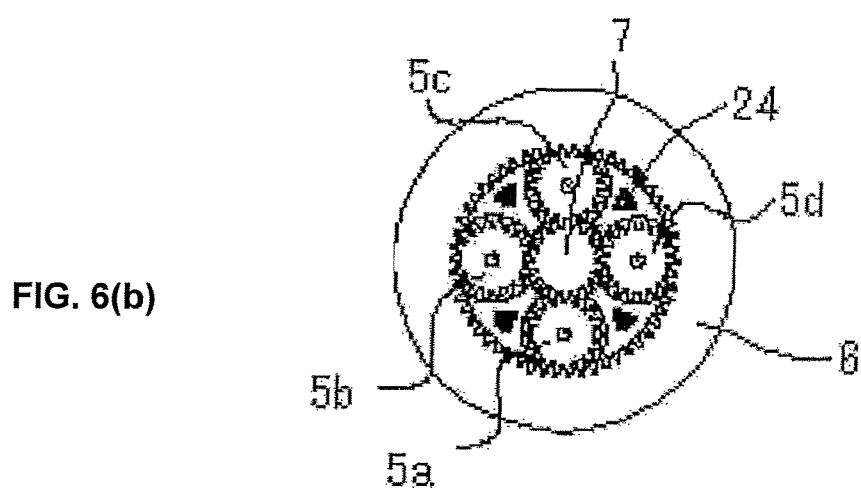
FIG. 6(b) is a schematic cross-sectional view taken along G-G.
Figure 6C:
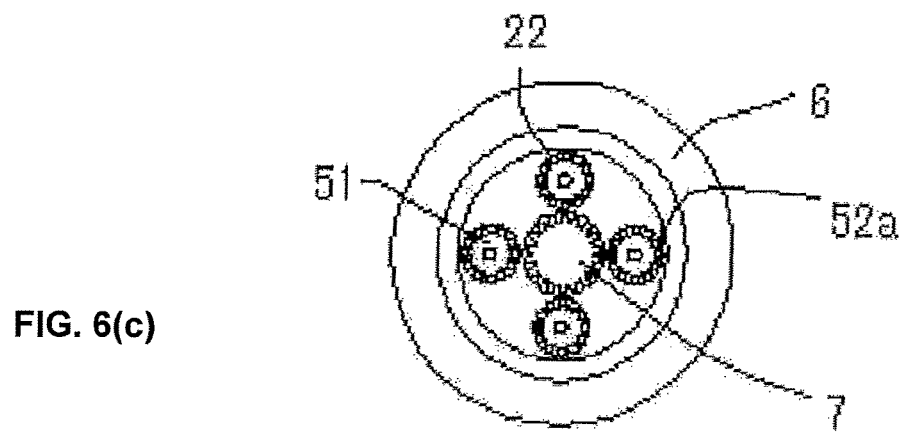
FIG. 6(c) is a schematic cross-sectional view taken along H-H of the planetary gear mechanism according to the first work example of the present invention.

FIG. 4(a) is a schematic right side view and FIG. 4(b) is a schematic left side view of the planetary gear mechanism according to the first work example of the present invention in which the power transmission member according to the first work example of the present invention is incorporated, and FIG. 4(c) is a schematic right side view illustrating arrangement of planetary gears. In FIG. 4(c), arrangement of the planetary gears is indicated by dotted lines. Furthermore, FIG. 5(a) is a schematic cross-sectional view taken along D-D, and FIG. 5(b) is a schematic cross-sectional view taken along D-E of the planetary gear mechanism according to the first work example of the present invention. FIG. 6(a) is a schematic cross-sectional view taken along F-F, FIG. 6(b) is a schematic cross-sectional view taken along G-G, and FIG. 6(c) is a schematic cross-sectional view taken along H-H of the planetary gear mechanism according to the first work example of the present invention.

In a planetary gear mechanism 8 according to the first work example of the present invention, the power transmission member 1 according to the first work example of the present invention is attached in a freely turnable manner to an internal gear 6 with a bearing. Furthermore, the sun gear and the planetary gear are attached to the power transmission member 1.

The internal gear 6 with the bearing includes: a tooth portion 63 to be engaged with a planetary gear 5; and power transmission member holding portions 64a, 64b provided at both axial sides of the tooth portion 63 and adapted to hold the power transmission member 1 in a freely turnable manner. The bearing is incorporated in each of the power transmission member holding portions 64a, 64b, and in the planetary gear mechanism 8 according to the first work example of the present invention, a needle bearing 62 is incorporated in the power transmission member holding portion 64a and a ball bearing 84a is incorporated in the power transmission member holding portion 64b. However, the types of bearings are not limited thereto. Meanwhile, the ball bearing 84a is incorporated into the internal gear 6 with the bearing by fitting C-shaped external snap rings 82a, 82b into the power transmission member holding portion 64b.

The rotary shaft portion 3 is attached to the needle bearing 62 in a freely turnable manner by inserting the power transmission member 1 into the above-described internal gear 6 with the bearing from the power transmission member holding portion 64a side. Furthermore, the planetary gear holding portion 2 is arranged in the tooth portion 63, and the sun gear holding portion 4 is attached to the ball bearing 84a in a freely turnable manner.

The internal gear 6 with the bearing is prevented from being rotated by being fixed to a casing or the like not illustrated. Therefore, the internal gear 6 with the bearing is prevented from being rotated in the planetary gear mechanism 8 according to the first work example of the present invention.

The needle bearings 52a, 52b are attached to respective shaft portions 51 at both ends of the planetary gear 5, the needle bearing 52a is attached to the bearing portion 22, and the needle bearing 52b is attached to the rotation support hole 33. Consequently, the shaft portions 51 at the both ends of the planetary gear 5 arranged in the planetary gear attachment portion 21 are supported by the bearing portion 22 and the rotation support hole 33 in a freely turnable manner.

When the planetary gear 5 is arranged in the planetary gear attachment portion 21, the planetary gear 5 is arranged such that a tooth portion 53 projects from the open window 23 on the outer peripheral surface. Therefore, when the power transmission member 1 is attached to the internal gear 6 with the bearing, the planetary gear holding portion 2 is arranged on the tooth portion 63 side of the internal gear 6 with the bearing, and the tooth portion 53 of the planetary gear 5 projecting from the open window 23 on the outer peripheral surface is engaged with the tooth portion 63 of the internal gear 6 with the bearing.

As illustrated in FIGS. 5(a) and 5(b), in the planetary gear mechanism 8 according to the first work example of the present invention, the planetary gear 5 has the tooth portion 53 and the shaft portion 51 integrally formed. According to the related art, in the case of not using a planetary pin, more specifically, in the case of using a planetary gear preliminarily integrally formed with a shaft portion, each planetary carrier is fastened by screwing or caulking in a state that the planetary gear is sandwiched between a pair of divided planetary carriers. But, there may be a problem in which such a fastening means cannot secure sufficient strength against torsional force. However, according to the planetary gear mechanism 8 according to the first work example of the present invention, even in the case of the planetary gear 5 in which the tooth portion 53 and shaft portion 51 integrally are formed, the planetary gear 5 can be introduced into the rotary shaft portion 3 from the opening end portion 31 side and then arranged in the planetary gear attachment portion 21 via the rotation support hole 33. Therefore, unlike the related art, the planetary gear 5 is not needed to be attached in a manner sandwiched between a pair of divided planetary carriers. Therefore, according to the planetary gear mechanism 8 according to the first work example of the present invention, the volume of the planetary gear mechanism can be reduced while sufficient strength is secured. Sufficient strength can be secured against torsional force, the planetary gear is easily attached, and repair is easily performed for each component at the time of failure. In FIGS. 5(a) and 5(b), note that a dot-and-dash lines indicate bearing engagement points.

Furthermore, since the tooth portion 53 and the shaft portion 51 of the planetary gear 5 are integrally formed, there is no need to form a through-hole to insert the planetary pin (shaft portion) at a center portion of the rotary shaft of the planetary gear 5. Therefore, sufficient dedendum strength of the planetary gear 5 can be secured even when the outer diameter of the planetary gear 5 is set small. Accordingly, the volume of the planetary gear mechanism 8 can be reduced while sufficient strength is secured by setting the outer diameter of the planetary gear 5 small. Particularly, in the case of rotating an output shaft three or four times (⅓, ¼) by rotating an input shaft once, a pinion is set larger and a gear is set smaller than a case of rotating the output shaft five/six times by rotating the input shaft once. Therefore, a rim thickness becomes thin the structure of the related art. In contrast, according to the planetary gear mechanism 8 of the first work example of the present invention, such a disadvantage can be prevented, and a high effect is provided in the aspect of strength.

As illustrated in FIGS. 4(a) to 5(b), a lid-like washer 81 is fitted into the rotary shaft portion 3 having the substantially cylindrical shape, thereby achieving to prevent the planetary gear 5 attached to the planetary gear holding portion 2 from falling off. A groove 34 is formed on an inner wall surface of the rotary shaft portion 3, and an internal snap ring 83 is fitted into the groove 34, thereby preventing the washer 81 from falling off.

As illustrated in FIGS. 5(a) and 5(b), in the planetary gear mechanism 8 according to the first work example of the present invention, a size in the rotary shaft direction is set twice or more of a size in a radial direction in the tooth portion 53 of the planetary gear 5. Furthermore, a size in a rotary shaft direction is set twice or more of a size in a radial direction in a tooth portion 72 of the sun gear 7. Additionally, the sizes in the rotary shaft direction of the respective tooth portions 53, 72 and the tooth portion 63 of the internal gear 6 with the bearing are substantially equal. Furthermore, the power transmission member 1 according to the first work example of the present invention has a structure in which a gear attachment portion has a predetermined length in the rotary shaft direction (longitudinal direction) relative to the radial direction such that the planetary gear and sun gear having the above-described size can be attached.

In the planetary gear mechanism 8 according to the first work example of the present invention, an area of an engagement portion between the planetary gear 5, sun gear 7, and internal gear 6 with the bearing can be increased. As a result, even when the outer diameter of the planetary gear 5 is set small, strength of the planetary gear 5 can be secured. Therefore, the volume of the entire planetary gear mechanism 8 can be reduced while sufficient strength is secured. Furthermore, even when the outer diameter of the sun gear 7 is set small, strength of the sun gear 7 can be secured, and the plurality of planetary gears 5 to be engaged with the sun gear 7 is arranged close by setting the outer diameter of the sun gear 7 small. Therefore, the sizes in the radial direction of the planetary gear holding portion 2 and internal gear 6 with the bearing can be set small, and the volume of the entire planetary gear mechanism 8 can be reduced.

Generally, when the entire planetary gear mechanism is elongated in the rotary shaft direction, stiffness against torsional force is hardly secured. However, in the planetary gear mechanism 8 according to the first work example of the present invention, the respective planetary gear holding portion 2, rotary shaft portion 3, and sun gear holding portion 4 are integrally formed. Therefore, sufficient strength can be secured against torsional force even when the entire planetary gear mechanism 8 is elongated in the rotary shaft direction by increasing the sizes of the planetary gear 5, sun gear 7, and internal gear 6 with the bearing.

A ball bearing 84b is incorporated in the sun gear insertion hole 41 of the sun gear holding portion 4, and a shaft portion 71 of the sun gear 7 is inserted in a freely turnable manner. Meanwhile, the ball bearing 84b is fitted into the sun gear holding portion 4 by fitting the external snap ring 82c into the sun gear holding portion 4.

The tip of the sun gear 7 is attached, in a freely turnable manner, to the through-hole 32 formed inside the rotary shaft portion 3. The plurality of planetary gears 5 is provided coaxially with the sun gear 7 on a circumference of the sun gear 7, and the tooth portion 72 of the sun gear 7 is engaged with the tooth portion 53 of each of the planetary gears 5. The tooth portion 63 of the internal gear 6 with the bearing is provided on the outside of each planetary gear 5 such that the tooth portion 53 of the planetary gear 5 is engaged with the tooth portion 63 of the internal gear 6 with the bearing. As described above, the internal gear 6 with the bearing is set unable to be rotated. Drive force of a drive source not illustrated is transmitted to the shaft portion 71 of the sun gear 7. In other words, the shaft portion 71 of the sun gear 7 correspond to a drive shaft (input shaft) and the rotary shaft portion 3 of the power transmission member 1 corresponds to a driven shaft (output shaft).

Therefore, when drive force is transmitted to the shaft portion 71 of the sun gear 7, the plurality of planetary gears 5 revolves around the sun gear 7 while rotating on their own axes, and the power transmission member 1 is rotated in a various speed by this revolving motion. Meanwhile, in the planetary gear mechanism 8 according to the first work example of the present invention, the internal gear 6 with the bearing is fixed, the shaft portion 71 of the sun gear 7 is set as the drive shaft, and the power transmission member 1 is set as the driven shaft. However, the present invention is not limited thereto, and can also be applied to a case where the internal gear 6 with the bearing is not fixed and the sun gear 7 is fixed or the planetary gear 5 is fixed. Moreover, the power transmission member 1 can be applied as the drive shaft as well.

Power Transmission Member and Planetary Gear Mechanism: Exemplary Test Production Next, a power transmission member and a planetary gear mechanism according to an exemplary test production of the present invention will be described using FIGS. 7(a) to 8.

Figure 7A:
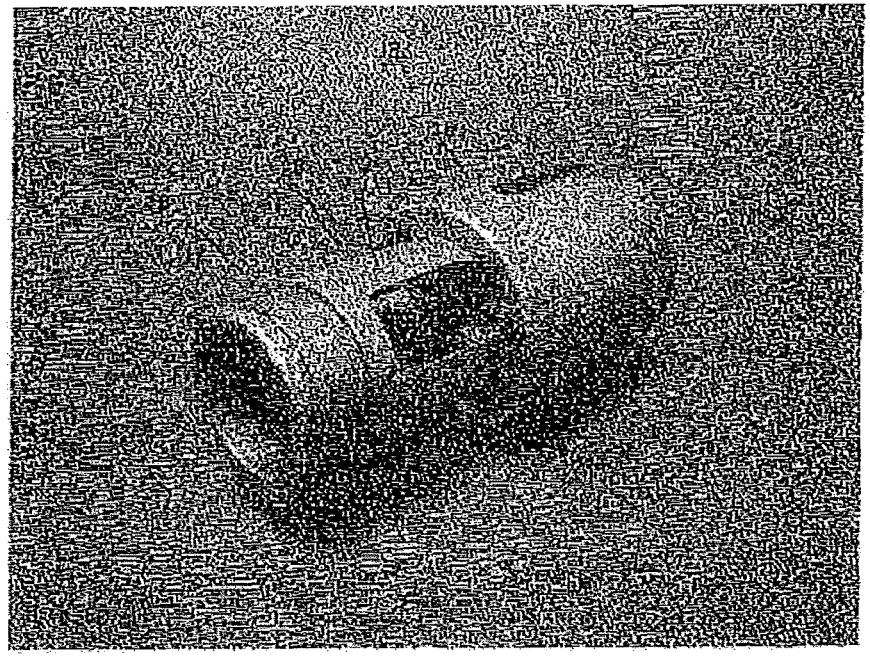
FIG. 7(a) is a perspective view illustrating an entire structure of a power transmission member and FIG. 7(b) is a perspective view illustrating a structure on a rotary shaft side according to an exemplary test production of the present invention.
Figure 7B:
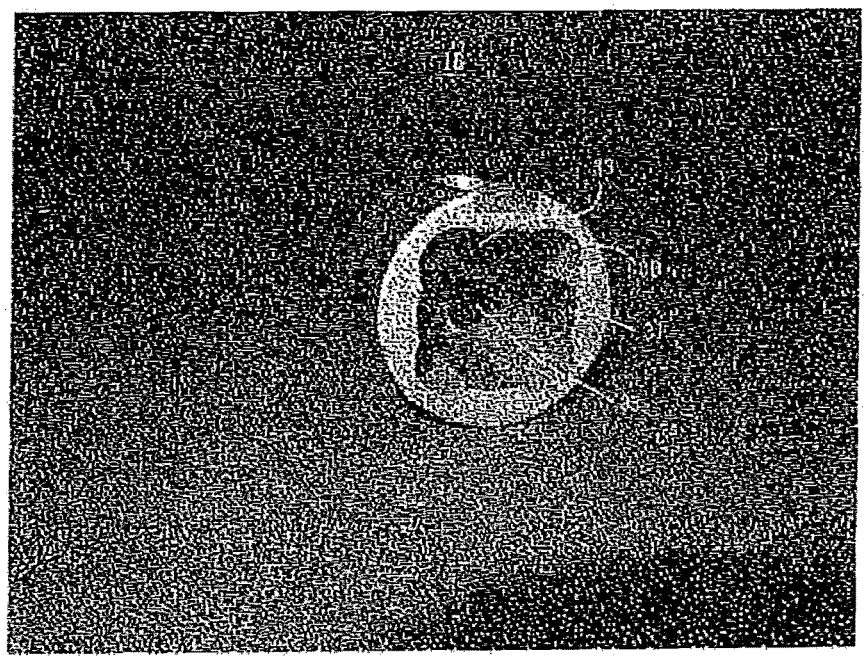
Figure 8:
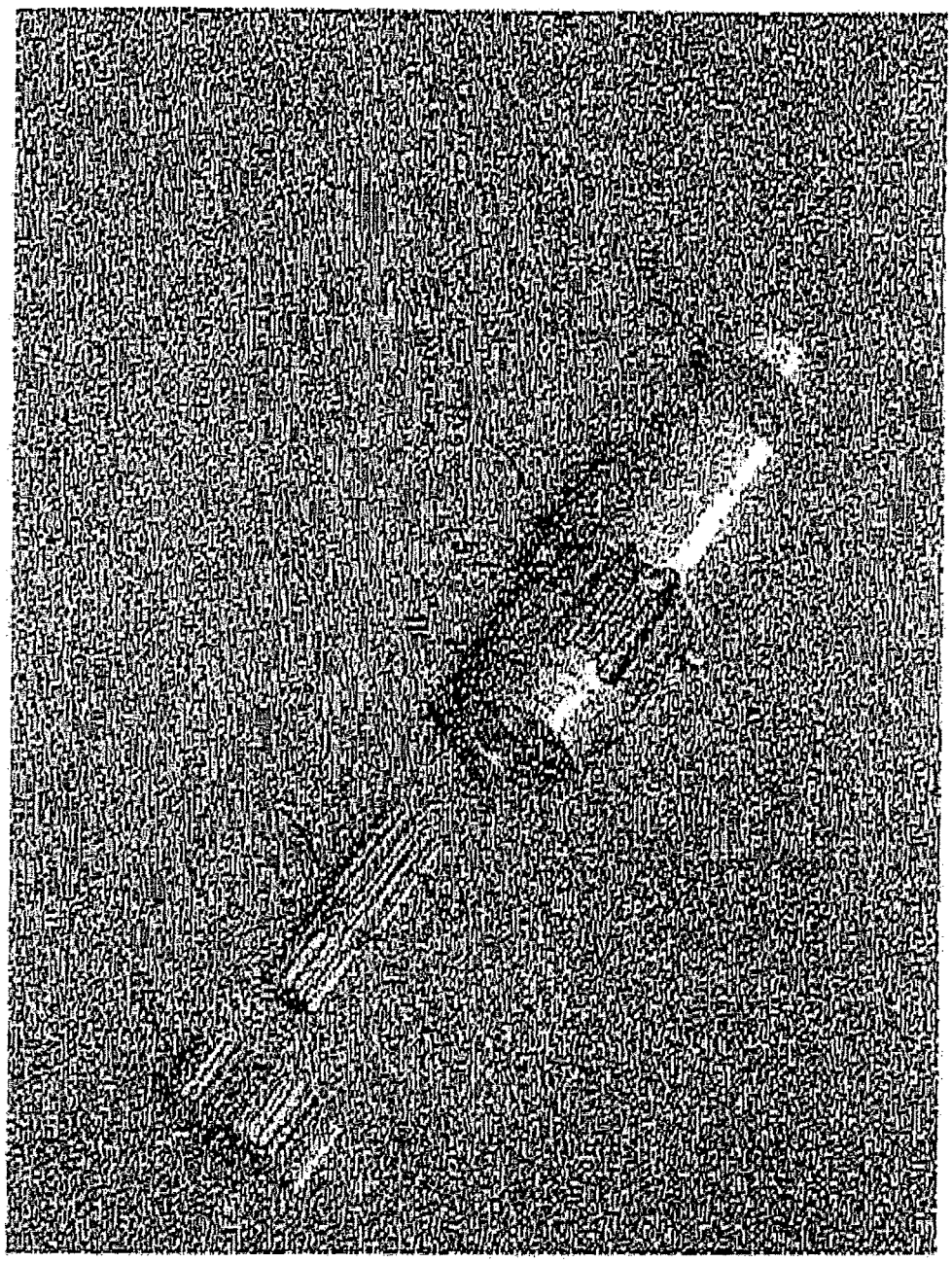
FIG. 8 is an explanatory diagram for an assembly method of a planetary gear mechanism according to an exemplary test production of the present invention in which the power transmission member according to the exemplary test production of the present invention is incorporated.
Figure 10A:
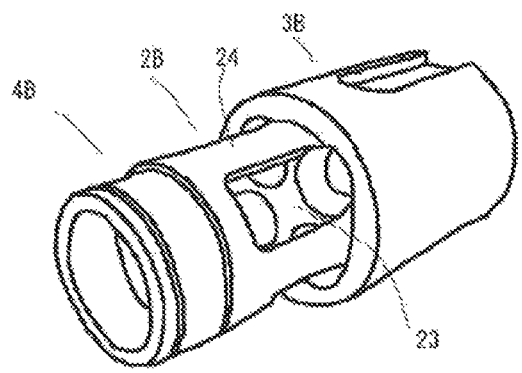
FIG. 10(a) is a perspective view (line diagram) illustrating an entire structure of a power transmission member according to an exemplary test production of the present invention.
Figure 10B:
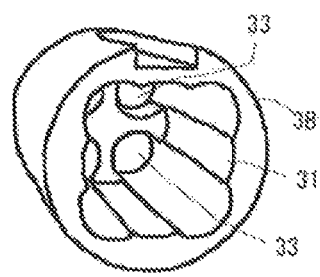
FIG. 10(b) is a perspective view (line diagram) illustrating a structure on a rotary shaft side.
Figure 11:
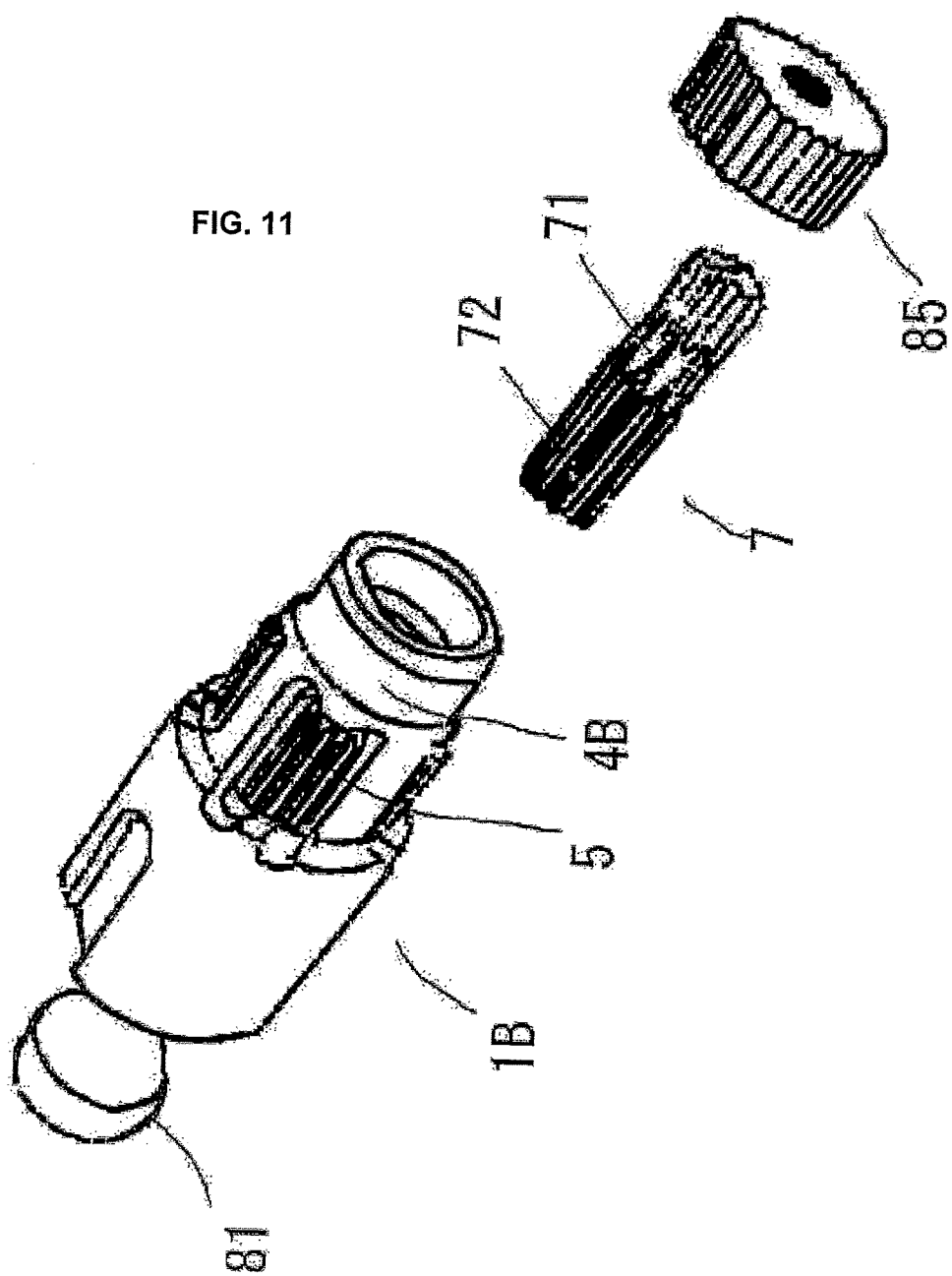
FIG. 11 is an explanatory diagram for an assembly method of a planetary gear mechanism according to an exemplary test production of the present invention in which the power transmission member according to the exemplary test production of the present invention is incorporated.

FIG. 7(a) is a perspective view illustrating an entire structure of the power transmission member and FIG. 7(b) is a perspective view illustrating a structure on the rotary shaft side according to the exemplary test production of the present invention. FIG. 8 is an explanatory diagram for an assembly method of the planetary gear mechanism according to the exemplary test production of the present invention in which the power transmission member according to the exemplary test production of the present invention is incorporated. In FIG. 8, note that the planetary gear 5 is already attached to a power transmission member 1B according to the exemplary test production of the present invention. FIGS. 10(a) and 10(b) are line diagrams representing the views illustrated in FIGS. 7(a) and 7(b). FIG. 11 is a line diagram representing the view illustrated in FIG. 8.

The power transmission member 1B according to the exemplary test production of the present invention partly differs from the power transmission member 1 according to the first work example of the present invention in that, for example, the through-hole 32, groove 34, and the like are not formed. However, the power transmission member 1B has the same characteristics as the above-described power transmission member of the present invention, and provides the same effects as the above-described power transmission member 1 according to the first work example of the present invention. The exemplary test production is made in order to help understanding of the present invention. More specifically, the power transmission member 1B is a power transmission member of the planetary gear mechanism that supports, in a freely turnable manner, the planetary gear to be engaged with the sun gear and the internal gear. The power transmission member 1B includes: a planetary gear holding portion 2B in which the planetary gear attachment portion to attach the planetary gear in a freely turnable manner is formed in the rotary shaft direction, the bearing portion to support, in a freely turnable manner, one end of the planetary gear attached to the planetary gear attachment portion is formed in the rotary shaft direction and communicates with the one end of the planetary gear attachment portion, and the open window is formed on a peripheral surface such that the tooth portion of the planetary gear attached to the planetary gear attachment portion projects from the outer peripheral surface; a substantially cylindrical-shaped rotary shaft portion 3B that communicates with the other end of the planetary gear and has the rotation support hole formed in the rotary shaft direction and adapted to support, in a freely turnable manner, the other end of the planetary gear attached to the planetary gear attachment portion; and a sun gear holding portion 4B having the sun gear insertion hole formed in the rotary shaft direction and adapted to insert the shaft portion of the sun gear into the center shaft of the planetary gear holding portion in a freely turnable manner. The planetary gear holding portion 2B, rotary shaft portion 3B, and the sun gear holding portion 4B are formed as an integrated body.

The planetary gear mechanism according to the exemplary test production of the present invention includes the power transmission member 1B, has the characteristics of the above-described planetary gear mechanism of the present invention although there are some differences from the planetary gear mechanism 8 according to the first work example of the present invention, and provides the same effects as the above-described planetary gear mechanism 8 according to the first work example of the present invention. The exemplary test production is made in order to help understanding of the present invention. In FIG. 8, the sun gear 7 to be inserted into the sun gear holding portion 4B, a drive gear 85 to be attached to the sun gear 7 and adapted to transmit drive force, and the washer 81 to be inserted into the power transmission member 1B are illustrated in order to show the assembly method in addition to the power transmission member 1B attached with the planetary gear 5. In the case where members and accessory members illustrated in FIG. 8 are assembled and attached to the internal gear fixed in a non-rotatable manner and then the drive gear 85 is rotated, the sun gear 7 is rotated, and the planetary gear 5 starts revolving motion by the rotary motion of the sun gear. Furthermore, the power transmission member 1B is rotated in tandem with the revolving motion. In the planetary gear mechanism according to the exemplary test production of the present invention, the planetary gear 5 has the tooth portion and the shaft portion integrally formed and is attached to the planetary gear attachment portion of the power transmission member 1B, and the size in the rotary shaft direction is twice or more of the size in the radial direction in the tooth portion of the planetary gear. Furthermore, in the sun gear 7, the size in the rotary shaft direction is twice or more of the size in the radial direction in the tooth portion 72 of the sun gear. According to the exemplary test production of the present invention, a casing size is 5.7 cm square and a length 7.0 cm, and the volume is about 227 cm$^3$. Comparing the exemplary test production of the present invention with the planetary gear mechanism in the related art by applying torque, torsional fracture does not occur in the exemplary test production of the present invention even when the torque that causes torsional fracture in the planetary gear mechanism having the structure of the related art. In the related art, the casing size is 8.5 cm square and length 7.0 cm and the volume of about 505 cm$^3$. According to the exemplary test production of the present invention, facture strength against torsion is strong even when the lengths are the same and the volume is about half.

Power Transmission Member and Planetary Gear Mechanism: Second Work Example

Next, a power transmission member and a planetary gear mechanism according to a second work example of the present invention will be described using FIG. 9.

Figure 9A:
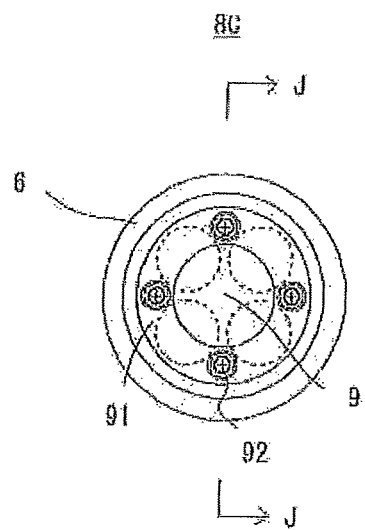
FIG. 9(a) is a schematic right side view illustrating arrangement of planetary gears.
Figure 9B:
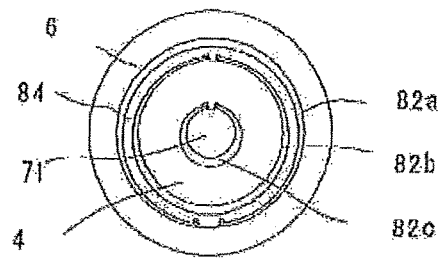
FIG. 9(b) is a schematic left side view.
Figure 9C:
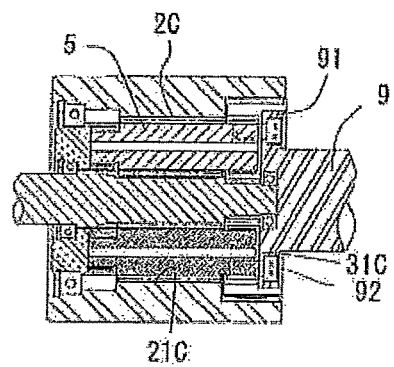
FIG. 9(c) is a schematic cross-sectional view taken along J-J of a planetary gear mechanism according to a second work example of the present invention in which a power transmission member according to a second work example of the present invention is incorporated.

FIG. 9(a) is a schematic right side view illustrating arrangement of planetary gears, FIG. 9(b) is a schematic left side view, and FIG. 9(c) is a schematic cross-sectional view taken along J-J of the planetary gear mechanism according to the second work example of the present invention in which the power transmission member according to the second work example of the present invention is incorporated. In FIG. 9(a), arrangement of the planetary gears is illustrated by dotted lines.

A power transmission member 1C according to the second work example of the present invention and the above-described first work example are common in being a power transmission member of a planetary gear mechanism that supports, in a freely turnable manner, the planetary gear 5 to be engaged with the sun gear 7 and the internal gear 6 with a bearing, and including a planetary gear holding portion 2C and the sun gear holding portion 4. More specifically, in the planetary gear holding portion 2C, a planetary gear attachment portion 21C to which the planetary gear 5 is attached in a freely turnable manner is formed in the rotary shaft direction, the bearing portion 22 that supports, in a freely turnable manner, one end of the planetary gear 5 attached to the planetary gear attachment portion 21C is formed in the rotary shaft direction, and the open window 23 is formed on the peripheral surface such that the tooth portion 53 of the planetary gear 5 attached to the planetary gear attachment portion 21C projects from the outer peripheral surface. Furthermore, in the sun gear holding portion 4, a sun gear insertion hole 41 into which the shaft portion 71 of the sun gear 7 is inserted in a freely turnable manner is formed in the rotary shaft direction, and includes the sun gear holding portion 4 integrally formed with the planetary gear holding portion 2.

The power transmission member 1C according to the second work example of the present invention has a structure in which a flange portion 91 provided at a driven shaft 9 connected to the power transmission member 1C is fastened to an opening end portion 31C side of the planetary gear holding portion 2C. With this structure, according to the power transmission member 1C of the second work example of the present invention, the flange portion 91 provided at the driven shaft 9 is fastened to the opening end portion 31C side of the planetary gear holding portion 2C. Therefore, the planetary gear 5 attached to the planetary gear attachment portion 21C can be prevented from falling off. Meanwhile, in the power transmission member 1C according to the second work example of the present invention, a hexagon socket bolt 92 is used for fastening, but not limited thereto.

Furthermore, in a planetary gear mechanism 8C according to the second work example of the present invention in which the power transmission member 1C according to the second work example of the present invention in incorporated, the planetary gear 5 is not arranged inside the driven shaft 9 connected to the planetary gear mechanism 8. Therefore, there is no need to provide a space to insert the planetary gear 5 inside the driven shaft 9 and a shaft diameter of the driven shaft 9 can be set small. Consequently, the volume on the driven shaft 9 side can be reduced.

According to the power transmission member 1C according to the second work example of the present invention and the planetary gear mechanism 8C according to the second work example of the present invention in which this power transmission member 1C is incorporated, the volume of the planetary gear mechanism can be reduced while sufficient strength is secured. Furthermore, the planetary gear is easily attached, repair is easily performed for each component at the time of failure, and moreover the planetary gear attached to the planetary gear attachment portion can be prevented from falling off by fastening the flange portion provided at the driven shaft to the opening end portion side of the planetary gear holding portion. Furthermore, different from the power transmission member according to the first work example of the present invention, the planetary gear is not arranged inside the driven shaft connected to the planetary gear mechanism. Therefore, there is no need to provide a space to insert the planetary gear inside the driven shaft, and a shaft diameter of the driven shaft can be set small. Consequently, the volume on the driven shaft side can be reduced.

Note that the present invention is not limited the above-described work examples and various kinds of modifications can be made in a range without departing from the gist of the invention. Furthermore, components of the respective work examples can be optionally combined in a range without departing from the gist of the invention. For example, in the above-described work examples, an involute gear is used for the gear, but the gear may be helical, Novikov, trochoid, arc, and so on.

REFERENCE SIGNS LIST

1 Power transmission member
2 Planetary gear holding portion
21 Planetary gear attachment portion
22 Bearing portion
23 Open window
24 Open window frame
25 Opening end portion
3 Rotary shaft portion
31 Opening end portion
32 Through-hole
33 Rotation support hole
34 Groove
4 Sun gear holding portion
41 Sun gear insertion hole
5 Planetary gear
51 Shaft portion
52 Needle bearing
53 Tooth portion
6 Internal gear with bearing
62 Needle bearing
63 Tooth portion
64 Power transmission member holding portion
7 Sun gear
71 Shaft portion
72 Tooth portion
8 Planetary gear mechanism
81 Washer
82 External snap ring
83 Internal snap ring
84 Ball bearing
85 Drive gear
9 Driven gear
91 Flange portion
92 Bolt

The invention claimed is:

1. A power transmission member provided as a power transmission member of a planetary gear mechanism configured to support, in a freely turnable manner, a planetary gear to be engaged with a sun gear and an internal gear, comprising:
   a planetary gear holding portion in which a planetary gear attachment portion to attach the planetary gear in a freely turnable manner is formed in a rotary shaft direction, a bearing portion to support, in a freely turnable manner, one end of the planetary gear attached to the planetary gear attachment portion is formed in a rotary shaft direction and communicates with the one end of the planetary gear attachment portion, and an open window is formed on a peripheral surface such that a tooth portion of the planetary gear attached to the planetary gear attachment portion projects from an outer peripheral surface;
   a substantially cylindrical-shaped rotary shaft portion configured to communicate with the other end of the planetary gear holding portion, and having a rotation support hole that is formed in the rotary shaft direction and supports, in a freely turnable manner, the other end of the planetary gear attached to the planetary gear attachment portion; and
   a sun gear holding portion having a sun gear insertion hole that is formed in a rotary shaft direction and is adapted to insert a shaft portion of the sun gear into a center shaft of the planetary gear holding portion in a freely turnable manner,
   wherein the planetary gear holding portion, the rotary shaft portion, and the sun gear holding portion are formed as an integrated body, and
   the planetary gear is inserted from an opening end portion of the rotary shaft portion, and is attached to the planetary gear attachment portion via the rotation support hole.

2. A planetary gear mechanism comprising:
   a power transmission member according to claim 1; and
   a planetary gear having a tooth portion and a shaft portion integrally formed, and
   configured to be attached to the planetary gear attachment portion.

3. The planetary gear mechanism according to claim 2, wherein the planetary gear is a planetary gear in which a size in a rotary shaft direction is twice or more of size in a radial direction in a tooth portion of the planetary gear.

4. The planetary gear mechanism according to claim 2, wherein the sun gear is a sun gear in which a size in a rotary shaft direction is twice or more of size in a radial direction in a tooth portion of the sun gear.

5. A power transmission member provided as a power transmission member of a planetary gear mechanism configured to support, in a freely turnable manner, a planetary gear to be engaged with a sun gear and an internal gear, comprising:
   a planetary gear holding portion in which a planetary gear attachment portion to attach the planetary gear in a freely turnable manner is formed in a rotary shaft direction, a bearing portion to support, in a freely turnable manner, one end of the planetary gear attached to the planetary gear attachment portion is formed in a rotary shaft direction and communicates with the one end of the planetary gear attachment portion, and an open window is formed on a peripheral surface such that a tooth portion of the planetary gear attached to the planetary gear attachment portion projects from an outer peripheral surface; and
   a sun gear holding portion having a sun gear insertion hole that is formed in a rotary shaft direction and is adapted to insert a shaft portion of the sun gear into a center shaft of the planetary gear holding portion in a freely turnable manner, and the sun gear holding portion being formed integrally with the planetary gear holding portion,
   wherein, in the planetary gear holding portion, the planetary gear attachment portions, the bearing portions, the open windows are formed at a plurality of positions at equal intervals around a rotary shaft, and additionally an opening end portion to be fastened to a driven shaft including a flange portion is provided, and the planetary gear is inserted from an opening end portion of the rotary shaft portion, and is attached to the planetary gear attachment portion via the rotation support hole.

6. The planetary gear mechanism according to claim 3, wherein the sun gear is a sun gear in which a size in a rotary shaft direction is twice or more of size in a radial direction in a tooth portion of the sun gear.

* * * * *